United States Patent
Keller et al.

(10) Patent No.: US 9,284,865 B2
(45) Date of Patent: Mar. 15, 2016

(54) METHOD OF CONTROLLING FLUID PRESSURE-ACTUATED SWITCHING COMPONENT AND CONTROL SYSTEM FOR SAME

(71) Applicant: Eaton Corporation, Cleveland, OH (US)

(72) Inventors: Robert D. Keller, Davisburg, MI (US); David Turner, Bloomfield Hills, MI (US); Mark L. Dell'Eva, Grand Blanc, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/882,808

(22) PCT Filed: Nov. 16, 2012

(86) PCT No.: PCT/US2012/065512
§ 371 (c)(1),
(2) Date: May 1, 2013

(87) PCT Pub. No.: WO2013/106131
PCT Pub. Date: Jul. 18, 2013

(65) Prior Publication Data
US 2014/0222313 A1    Aug. 7, 2014

Related U.S. Application Data

(60) Provisional application No. 61/585,396, filed on Jan. 11, 2012.

(51) Int. Cl.
*F01L 13/00* (2006.01)
*F01L 1/14* (2006.01)
(Continued)

(52) U.S. Cl.
CPC ............. *F01L 13/0015* (2013.01); *F01L 1/14* (2013.01); *F01L 1/18* (2013.01); *F01L 13/0036* (2013.01);
(Continued)

(58) Field of Classification Search
CPC ...... F01L 9/02; F01L 2800/00; F01L 13/0015; F02D 2041/001; F02D 41/20; F16K 31/0644
USPC .......... 123/90.11, 90.12, 90.13, 90.15–90.19, 123/499; 701/103, 105; 251/129.04; 73/114.56, 114.58, 114.79; 137/487.5
See application file for complete search history.

(56) References Cited

U.S. PATENT DOCUMENTS 4,009,695 A * 3/1977 Ule ........................... 123/90.13
4,781,080 A   11/1988 Iwatsuki
(Continued)

FOREIGN PATENT DOCUMENTS

CN    1847670 A    10/2006
CN    101981362 A   2/2011
WO    9951864 A2   10/1999

OTHER PUBLICATIONS

International Search Report and Written Opinion of International Search Authority (KR) dated Mar. 29, 2013.

*Primary Examiner* — Erick Solis
*Assistant Examiner* — Carl Staubach
(74) *Attorney, Agent, or Firm* — Quinn Law Group, PLLC

(57) ABSTRACT

A method includes energizing a solenoid valve of a hydraulic control system according to a predetermined timing schedule to move a valve member of the solenoid valve. The solenoid valve is operatively connected to the switching component by a fluid control passage, such as a passage in an engine block, to deliver pressurized fluid from a supply passage when the valve member moves to switch the switching component from a first mode to a second mode. An operating parameter of the control system is measured. The operating parameter may be a period of time over which the valve member moves, or a sensed operating parameter of the fluid, such as pressure or temperature. The measured parameter is then compared with a predetermined parameter. Energizing of the solenoid valve is then adjusted based on the difference.

20 Claims, 4 Drawing Sheets

(51) Int. Cl.
  *F01L 1/18* (2006.01)
  *F16K 31/06* (2006.01)
  *F01L 1/24* (2006.01)

(52) U.S. Cl.
  CPC ............... *F16K 31/0644* (2013.01); *F01L 1/24* (2013.01); *F01L 2800/00* (2013.01); *F01L 2820/043* (2013.01)

(56) References Cited

U.S. PATENT DOCUMENTS

| | | | |
|---|---|---|---|
| 5,349,885 A | 9/1994 | Yoshimura et al. | |
| 5,450,270 A * | 9/1995 | Takahashi | 361/154 |
| 5,456,222 A * | 10/1995 | Schechter | 123/90.12 |
| 5,839,412 A * | 11/1998 | Stockner et al. | 123/446 |
| 6,000,374 A | 12/1999 | Cosma et al. | |
| 6,122,583 A | 9/2000 | Kirchhoffer et al. | |
| 6,158,715 A * | 12/2000 | Kirschbaum | 251/129.06 |
| 6,178,946 B1 | 1/2001 | Matthews et al. | |
| 6,196,175 B1 | 3/2001 | Church | |
| 6,237,559 B1 | 5/2001 | Russ et al. | |
| 6,325,030 B1 | 12/2001 | Spath et al. | |
| 6,332,445 B1 | 12/2001 | Voss et al. | |
| 6,378,473 B2 * | 4/2002 | Yamaki et al. | 123/90.11 |
| 6,499,451 B1 | 12/2002 | Hendriksma et al. | |
| 6,502,536 B2 | 1/2003 | Lee et al. | |
| 6,581,634 B2 | 6/2003 | Najmolhoda et al. | |
| 6,588,394 B2 | 7/2003 | Zheng | |
| 6,647,947 B2 | 11/2003 | Boyer et al. | |
| 6,745,731 B2 * | 6/2004 | Tanaka | F01L 9/02 123/90.12 |
| 6,752,107 B2 | 6/2004 | Kreuter | |
| 6,752,121 B2 | 6/2004 | Rayl et al. | |
| 6,758,177 B1 | 7/2004 | McKay et al. | |
| 6,871,617 B1 | 3/2005 | Winstead et al. | |
| 6,915,775 B2 | 7/2005 | Patterson et al. | |
| 6,920,849 B2 | 7/2005 | Haas et al. | |
| 6,997,147 B2 * | 2/2006 | Panciroli | 123/90.12 |
| 7,194,349 B2 * | 3/2007 | Surianarayanan et al. | 701/60 |
| 7,204,212 B2 * | 4/2007 | Donaldson | 123/90.12 |
| 7,866,286 B2 * | 1/2011 | Sun | 123/90.12 |
| 8,327,750 B2 * | 12/2012 | Keller et al. | 91/421 |
| 8,485,148 B2 * | 7/2013 | Schiemann | 123/90.12 |
| 2003/0234007 A1 * | 12/2003 | Hokazono et al. | 123/478 |
| 2004/0035388 A1 * | 2/2004 | Diehl et al. | 123/322 |
| 2004/0112326 A1 | 6/2004 | Haas et al. | |
| 2005/0022758 A1 | 2/2005 | Panciroli | |
| 2005/0045237 A1 | 3/2005 | Dean | |
| 2005/0087716 A1 | 4/2005 | Udd | |
| 2007/0068474 A1 | 3/2007 | Cinpinski et al. | |
| 2007/0089698 A1 | 4/2007 | Stretch et al. | |
| 2009/0014672 A1 * | 1/2009 | Schiemann | 251/129.01 |
| 2009/0096283 A1 * | 4/2009 | Nishikawa et al. | 303/122.05 |
| 2011/0214631 A1 * | 9/2011 | Sato et al. | 123/90.1 |
| 2011/0288715 A1 * | 11/2011 | Schaffeld et al. | 701/29 |
| 2011/0290211 A1 * | 12/2011 | Coldren et al. | 123/299 |

* cited by examiner

_US 9,284,865 B2_

METHOD OF CONTROLLING FLUID PRESSURE-ACTUATED SWITCHING COMPONENT AND CONTROL SYSTEM FOR SAME

TECHNICAL FIELD

The present teachings relate to a method of controlling a fluid pressure-actuated switching component.

BACKGROUND

A variety of fluid pressure-actuated components include a valve mechanism that is controllable to switch operating modes of the component by directing pressurized fluid to the component. For example, variable valve actuation systems are sometimes used to control the amount of lift of an engine valve and the associated flow of combustion gas into or out of an engine cylinder. Additionally, an engine pump may be operable in a high output mode and a low output mode, with a valve mechanism controlling pressurized fluid flow to the pump to control a switch between the two modes. It may be desirable to closely control the timing of a switch between modes.

Engines generally may have a timing cycle that is based on a four-stroke engine cycle. Variable valve actuation systems can be switched between modes only during a predetermined window of time. Shifting the variable valve actuation system outside of the timing window may result in a critical shift event, which is a shift in engine valve position during a point in the engine cycle when loading on the valve actuator switching component or on the engine valve is higher than the structure is designed to accommodate while switching. A critical shift event may result in damage to the valvetrain and/or other engine parts. Depending upon the engine design and engine speed, the timing window for shifting a variable valve actuation system may be confined to a very limited period of time, for example, 10 milliseconds.

SUMMARY

A method of controlling a fluid pressure-actuated switching component and a system for actuating such a component are provided that prevent critical shift events and dynamically adjust the timing of a fluid pressure-actuated switching component, such as a variable valve actuation system. To precisely time the mode shift, system response times are considered, such as the time to energize the oil control valve coil, the time to shift the valve spool or other valve element, the time to move pressurized fluid to the switching component, and the time to move the switching component between the different modes. In the field, many factors may impact the timing of a valve mode shift. In automotive engines, the temperature of the oil and type of oil used may impact the viscosity of the oil and time required to perform a mode shift. Other factors that may bear upon mode shift timing include whether the oil is contaminated, deteriorated, or was recently changed. Oil additives may also affect viscosity and can impact the timing relationships. In addition, engine wear or blockages in the oil gallery of the engine head may further complicate switching between variable valve actuation modes.

The method and system compensate for operating conditions that can impact timing of critical shift events. Operating conditions, such as non-conforming oil, oil additives, oil temperature changes, oil contamination, oil deterioration and engine wear are reliably compensated for by adjustments to a timing schedule.

The method includes energizing a solenoid valve according to a predetermined timing schedule to move a valve member of the solenoid valve. The solenoid valve is operatively connected to the switching component by a control passage, such as a passage in an engine block, to deliver pressurized fluid from a supply passage when the valve member moves to switch the switching component from a first mode to a second mode. Subsequent to energizing the solenoid valve, an operating parameter is measured. The operating parameter may be a period of time over which the valve member moves, or a sensed operating parameter of the fluid, such as pressure or temperature. The measured parameter is then compared with a predetermined parameter. For example, a difference may be calculated between a period of time over which the valve member moves and a predetermined period of time, or the measured fluid pressure or temperature may be compared with predetermined values. Energizing of the solenoid valve is then adjusted based on the difference. The amount of current supplied to the solenoid valve may be adjusted, or the time prior to the desired switch at which the current is supplied may be adjusted. In some embodiments, the adjusting may occur after the energizing and prior to the desired switch (i.e., during the same switching event). In other embodiments, the adjusting may occur after the switch and prior to a subsequent energizing and switching event (i.e., affecting the next switching event). The predetermined parameters may be stored in a controller. In some embodiments, a processor with the algorithm that calculates the difference between the measured operating parameter and the predetermined operating parameter, and/or any sensors used to provide pressure or temperature feedback for adjusting the solenoid are integrated with the solenoid as a valve module.

The above features and advantages and other features and advantages of the present teachings are readily apparent from the following detailed description of the best modes for carrying out the present teachings when taken in connection with the accompanying drawings.

DESCRIPTION OF THE PREFERRED EMBODIMENTS

Figure 1:
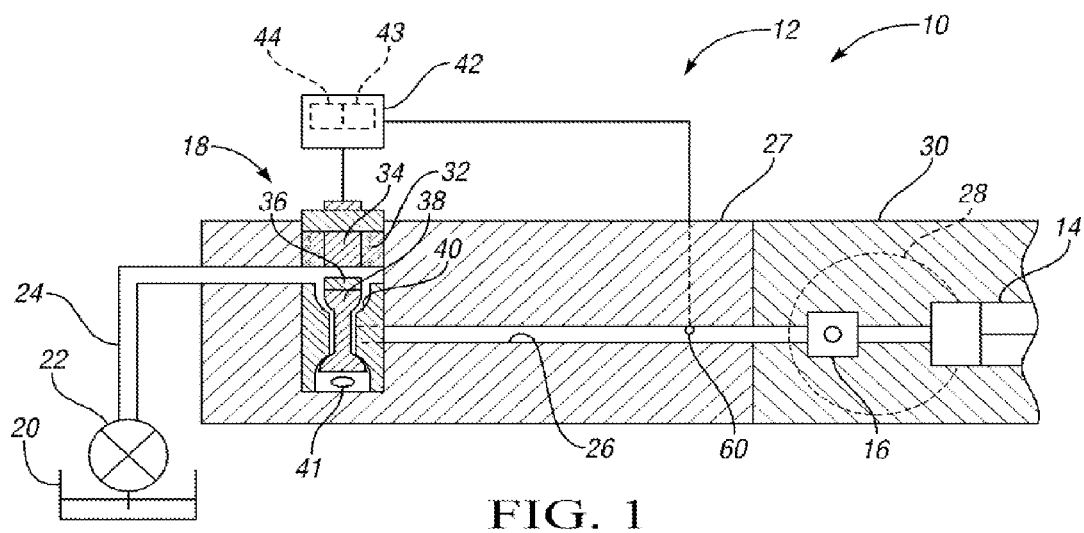
FIG. 1 is a schematic illustration in partial cross-sectional and fragmentary view of a first embodiment of a control system for a fluid-actuated engine valve lift switching component.

Referring to the drawings, wherein like reference numbers refer to like components throughout the several views, FIG. 1 shows a portion of an engine 10 including a hydraulic control system 12 that controls hydraulic fluid flow to engine valve lift switching components such as rocker arms 14 and lash adjusters 16 (one of each shown). The hydraulic fluid in the control system 12 is also referred to herein as oil. The rocker arm 14 position changes with the cam profile of a camshaft (not shown) that lifts and lowers engine valves as it rotates. The lash adjuster 16 also affects the amount of lift of an engine valve.

The hydraulic control system 12 shown in FIG. 1 illustrates control of hydraulic fluid by an energizable solenoid valve 18. The valve 18 selectively permits fluid from an oil sump 20, which is pressurized via a pump 22, to flow from a supply passage 24 to a control passage 26 formed in a valve manifold 27. The control passage 26 is in fluid communication with the rocker arm 14 and lash adjuster 16. If the fluid pressure in the control passage 26 is sufficiently high, the rocker arm 14 and the lash adjuster 16, will be actuated, which changes the amount of lift of valves permitting combustion gas flow into or out of a combustion chamber 28 in a cylinder head 30. The manifold 27 is mounted to the cylinder head 30.

The solenoid valve 18 has an energizable coil 32 surrounding a pole piece 34. When the coil 32 is energized, magnetic flux pulls an armature 36 toward the pole piece 34. A valve member 38 attached to the armature 36 lifts from a valve seat 40, as shown, to permit flow from the supply passage 24 to the control passage 26 to actuate the rocker arm 14 and lash adjuster 16. When the rocker arm 14 or lash adjuster 16 is actuated, an engine valve operatively connected thereto is switched from a first mode (e.g., high lift or open) to a second mode (e.g., low lift or closed). When the coil 32 is not energized, the valve member 38 is seated on the valve seat 40, and blocks fluid flow from the supply passage 24 to the control passage 26. After the valve member 38 is seated on seat 40, some fluid will exhaust through exhaust passage 41 which is routed back to the sump 20.

An engine controller 42 controls the energizing of the solenoid valve 18 based on an algorithm stored in a processor 43 that predicts the response time of the actuators (i.e., the amount of time between energizing the coil 32 and actuation of the rocker arm 14 and the lash adjuster 16). The algorithm is based on operating parameters that affect oil viscosity, and therefore actuator response time after energizing the solenoid. The operating parameters include oil temperature, oil pressure, other oil viscosity sensing systems, oil usage predictions, mileage, speed, and driving conditions, engine bearing wear, and oil degradation. A database 44 contains a timing schedule calculated according to the algorithm and corresponding to input data for the various operating parameters.

The algorithm also attempts to account for uncontrolled variables, referred to as "noise", which affect oil viscosity, and therefore response time of the valve 18 and the actuators of the rocker arm 14 and lash adjuster 16. Use of the wrong oil, use of oil additives, failure to maintain oil level or change oil according to instructions in an owner's manual, and others factors also affect oil viscosity and therefore response time of the solenoid valve and of the rocker arm 14 and lash adjuster 16.

The control system 12 is configured to update the stored timing schedule to account for the uncontrolled variables that affect oil viscosity. The adjusted timing schedule will offset the stored actuation times by the difference between a measured value and a predetermined value. For example, the stored time for energizing the solenoid valve 18 for a given set of engine operating conditions will be offset by the difference between the predetermined time to actuate the solenoid valve 18 and the measured time to actuate the solenoid valve 18. Alternately, the amount of current supplied to energize the solenoid valve 18 may be updated based on the measured difference. Energizing of the solenoid valve 18 may also be modified based on a difference between a different stored operating parameter, such as an expected pressure due to actuation of the solenoid valve 18, and a measured pressure. Modifying the stored timing schedule based on operating parameters will result in actuating the switching components 14, 16 at times appropriate for actual engine operating conditions, including actual oil viscosity, to prevent damage to the switching components 14, 16 that could occur if they are actuated when the camshaft or the engine crankshaft is not in a position designed to accommodate actuation.

Figure 2:
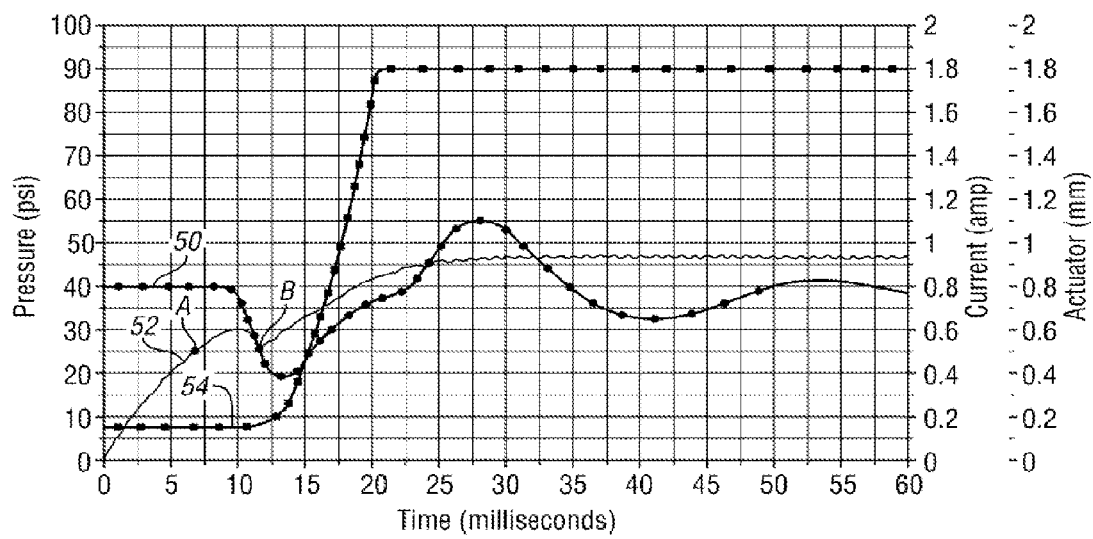
FIG. 2 is a representative plot of fluid supply pressure, solenoid valve current and switching component position versus time for the control systems described herein.

Referring to FIG. 2, curve 50 illustrates fluid pressure in the supply passage 24 (in pounds per square inch, on the left vertical axis) versus time (in milliseconds). Curve 52 illustrates current drawn by the solenoid valve 18 (in amperes, on right vertical axis) versus time. Curve 54 illustrates movement of an actuator in the lash adjuster 16 (in millimeters) versus time. Curve 50 shows that supply pressure in supply passage 24 of FIG. 1 decreases as solenoid valve 18 actuates. Actuation of solenoid valve 18 is indicated by the inductive kick of curve 52 showing the current drawn by the solenoid valve 18. The inductive kick is a distinct dip, followed by an increase in current draw, and is indicative of the solenoid valve member 38 and armature 36 reaching the end of travel toward pole piece 34. Those skilled in the art readily understand the concept of an inductive kick. The time during which the armature 36 and valve member 38 of the solenoid valve 18 move is the time between points A and B on curve 52. Point A corresponds to the time that the supply pressure shown on curve 50 begins to dip slightly as the solenoid valve 18 opens. Point B corresponds to the inductive kick of the solenoid valve 18 as the armature 36 and valve member 38 reach the end of travel. Actuation of the solenoid valve 18 corresponds with the beginning of travel of lash adjuster actuator, as indicated by the rise in curve 54. Thus, adjusting the amount of current provided to the solenoid valve 18 or the timing of the current (i.e., adjusting the energizing) affects when the rocker arm 14 actuates and when the lash adjuster 16 actuates.

Referring again to FIG. 1, a pressure sensor 60 is positioned in communication with fluid in control passage 26 such that the sensor 60 is operable to detect the pressure of the fluid and send a sensor signal indicative of the pressure to the controller 42. The algorithm in processor 43 compares the pressure measured by pressure sensor 60 to an expected pressure (stored in database 44). If there is a difference between these two values, then the rocker arm 14 and/or lash adjuster 16 did not actuate at the predetermined time, as the pressure supplied was not according to the predetermined schedule. The algorithm in processor 43 is updated with the difference in pressure values and with an adjustment in the stored actuation time of the solenoid valve 18 corresponding with the difference. Thus, a subsequent energizing of the solenoid valve 18 according to the updated stored algorithm will actuate the rocker arm 14 and lash adjuster 16 in better correspondence with existing engine operating parameters. Sensing of the actual pressure in control passage 26 at a predetermined time and updating of the algorithm with the sensed information continues with each subsequent energizing. Accordingly, the timing schedule is modified to track and adapt to changing engine operating parameters, such as may occur following an oil change, addition of an oil additive, or another occurrence that may affect oil viscosity and thus the appropriate solenoid energizing schedule.

Figure 3:
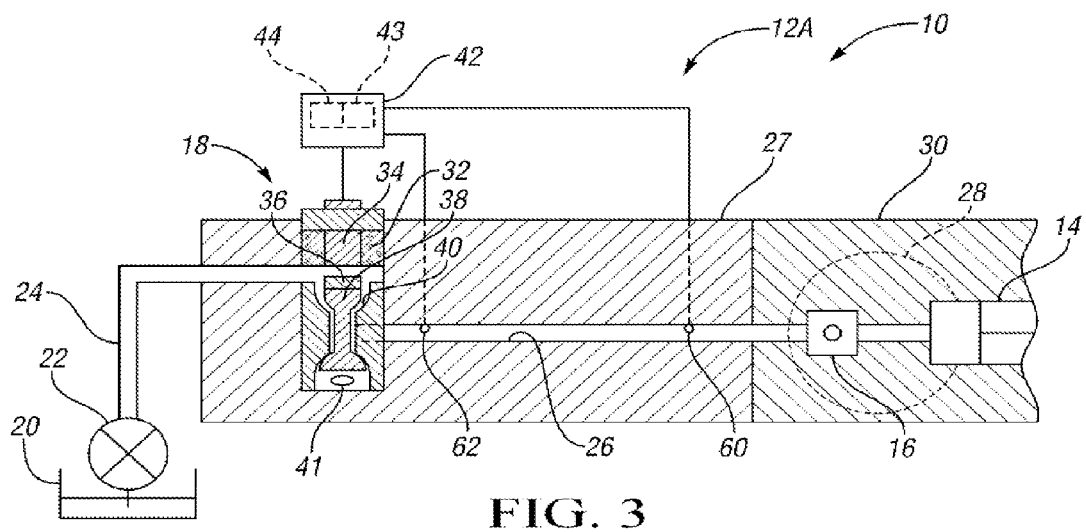
FIG. 3 is a schematic illustration in partial cross-sectional and fragmentary view of a second embodiment of a control system for a fluid-actuated engine valve lift switching component.

Referring to FIG. 3, an alternative embodiment of a hydraulic control system 12A is illustrated. The hydraulic control system 12A is identical to hydraulic control system 12 of FIG. 1, except that an additional pressure sensor 62 is positioned in the control passage 26 nearer to the solenoid valve 18 than the sensor 60. Pressure sensor 62 is in fluid communication with fluid in control passage 26, and is operable to detect the pressure of the fluid and send a sensor signal indicative of the pressure to the controller 42. The processor 43 will calculate the difference in time that the two pressure sensors 60, 62 reach a predetermined pressure, and compare this to a predetermined time difference used by the algorithm to calculate fluid viscosity and, ultimately, the energizing (timing and level of current) of the solenoid valve 18. Any difference between the predetermined time difference and the actual time difference can be used to offset the stored predetermined time difference, thus resulting in a more accurate timing schedule for energizing the solenoid valve 18.

Figure 4:
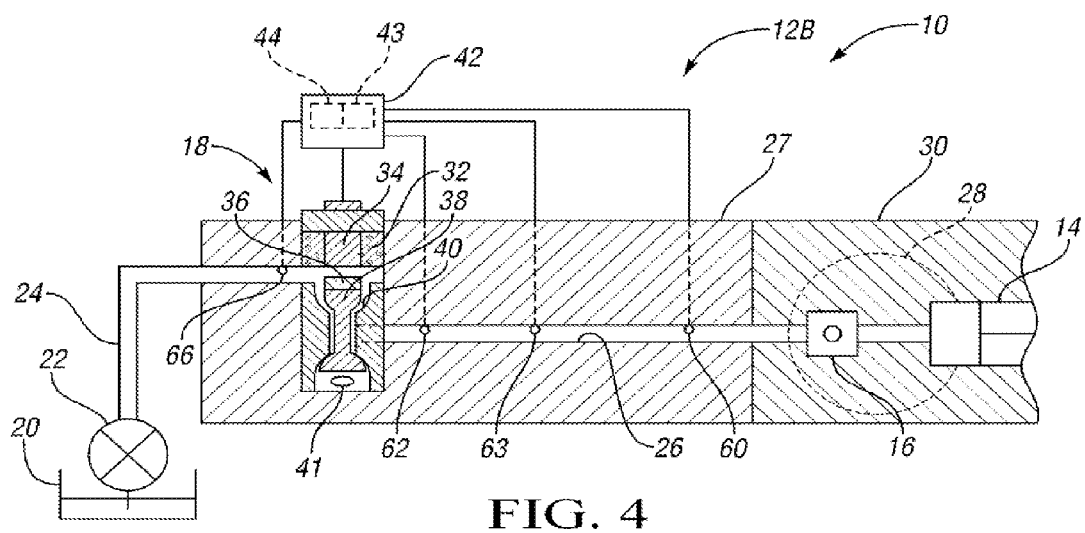
FIG. 4 is a schematic illustration in partial cross-sectional and fragmentary view of a third embodiment of a control system for a fluid-actuated engine valve lift switching component.

Referring to FIG. 4, an alternative embodiment of a hydraulic control system 12B is illustrated. The hydraulic control system 12B is identical to hydraulic control system 12A of FIG. 3, except that a temperature sensor 63 is positioned in control passage 26, and an additional pressure sensor 66 is positioned in the supply passage 24 upstream of the solenoid valve 18.

The temperature sensor 63 measures the actual temperature of the fluid in the control passage 26. The algorithm in processor 43 compares the temperature measured by temperature sensor 63 to a predetermined expected temperature (stored in database 44). If there is a difference between these two values, then the algorithm in processor 43 is updated with the difference in temperature values and with an adjustment in the stored actuation time of the solenoid valve 18 corresponding with the difference. Thus, a subsequent energizing of the solenoid valve 18 according to the updated stored algorithm will actuate the rocker arm 14 and lash adjuster 16 in better correspondence with existing engine operating parameters. Temperature of the fluid is related to its viscosity and therefore affects the timing schedule that will ensure that valve actuation does not result in a critical shift event. Pressure sensor 66 is in fluid communication with fluid in supply passage 24, and is operable to detect the pressure of the fluid in the supply passage 24 just upstream of the solenoid valve 18 at the time of energizing the solenoid valve 18. Pressure at the sensor 66 will drop when solenoid valve 18 is energized. The sensor 66 sends a sensor signal indicative of the pressure to the controller 42. The processor 43 will compare the difference between the measured pressure and a predetermined pressure stored in the database 44 used by the algorithm to calculate fluid viscosity and, ultimately, the energizing (timing and level of current) of the solenoid valve 18. Any difference between the predetermined pressure and the actual pressure can be used to offset the stored predetermined pressure, thus resulting in a more accurate timing schedule for energizing the solenoid valve 18.

Figure 5:
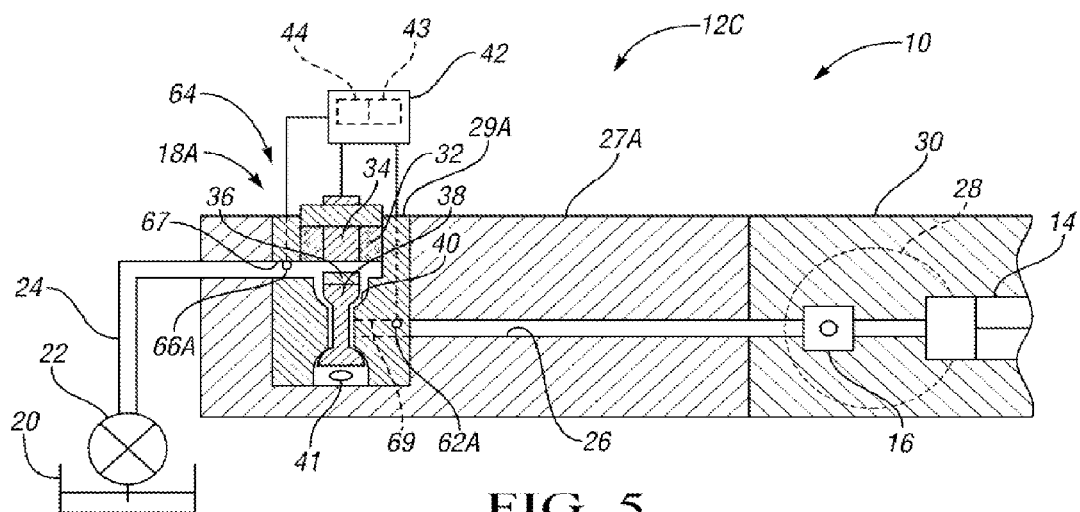
FIG. 5 is a schematic illustration in cross-sectional view of a fourth embodiment of a control system for a fluid-actuated engine valve lift switching component, including a valve module with a solenoid valve and sensors integrated therein.

Referring to FIG. 5, another alternative embodiment of a hydraulic control system 12C is illustrated. The hydraulic control system 12C has many of the same components as hydraulic control systems 12, 12A and 12B, and such components are numbered accordingly. The hydraulic control system 12C includes a solenoid valve 18A that is integrated with pressure sensors 62A and 66A in a valve body 29A as a valve module 64 configured to fit within valve manifold 27A. Pressure sensor 66A is mounted to valve body 29A in a valve body supply port 67 in fluid communication with the supply passage 24. Pressure sensor 62A is mounted to valve body 29A in a valve body control port 69 in fluid communication with the control passage 26. The pressure sensors 62A and 66A are configured to function the same as pressure sensors 62 and 66, respectively, of FIG. 4 described above. By incorporating the sensors 62A, 66A in the valve module 64, necessary wiring to the controller 42 is shortened, and assembly is simplified.

Figure 6:
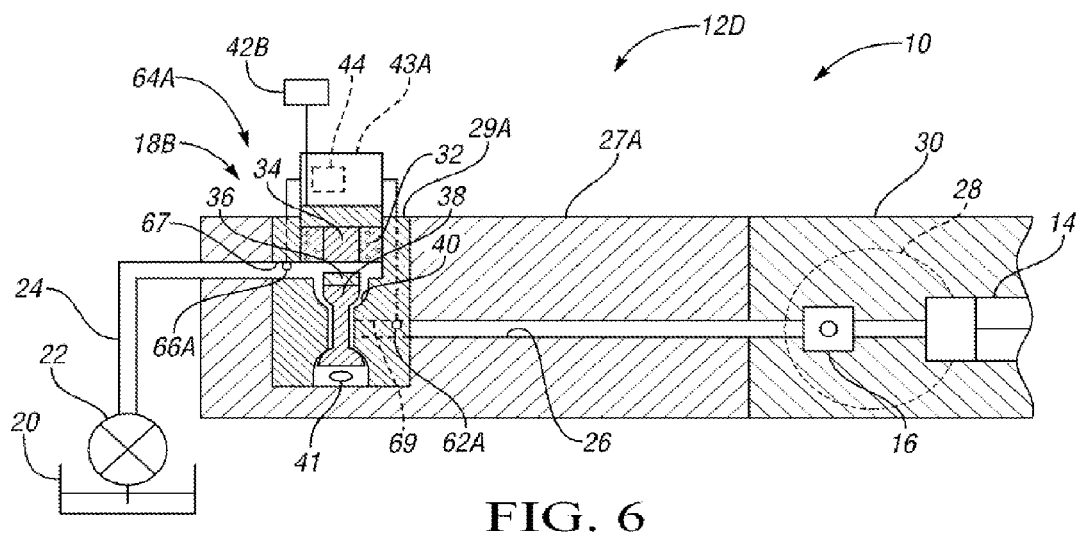
FIG. 6 is a schematic illustration in partial cross-sectional and fragmentary view of a fifth embodiment of system for actuating a valve lift switching component, including a valve module with a solenoid valve, sensors, and a processor integrated therein.

Referring to FIG. 6, another alternative embodiment of a hydraulic control system 12D is illustrated. The hydraulic control system 12D has many of the same components as hydraulic control systems 12, 12A, 12B, and 12C, and such components are numbered accordingly. The hydraulic control system 12D includes a solenoid valve 18B that is integrated with pressure sensors 62A and 66A in a valve body 29A as a valve module 64A configured to fit within valve manifold 27A, similar to valve module 64. However, valve module 64A also has a processor 43A integrated in the valve module 64A. The processor 43A sends the sensed information to the engine controller 42B for engine use. The controller 42B has the predetermined timing schedule and sends an actuation signal to the valve 18B, along with other engine operating parameters that the processor 43A analyses. The processor 43A includes the algorithm described above that calculates the offsets to the database 44 based on the sensed information. The processor 43A calculates the offsets to the database based on a comparison of stored values with sensed values, as described above. Because wiring from sensors 62A, 66A need only connect with the processor 43A, noise and data response time is reduced in comparison to a system with wires that run to a processor in an engine controller. With the processor 43A mounted directly to the valve 18B, data from the sensors 62A and 66A can be processed by the processor 43A quickly enough so that energizing of the solenoid valve 18B (i.e., amount of current or timing of the current) can be adjusted during the same shift event. "During the same shift event" means after energizing has begun but before shifting of the shifting components (rocker arm 14 and lash adjuster 16) is complete.

Figure 7:
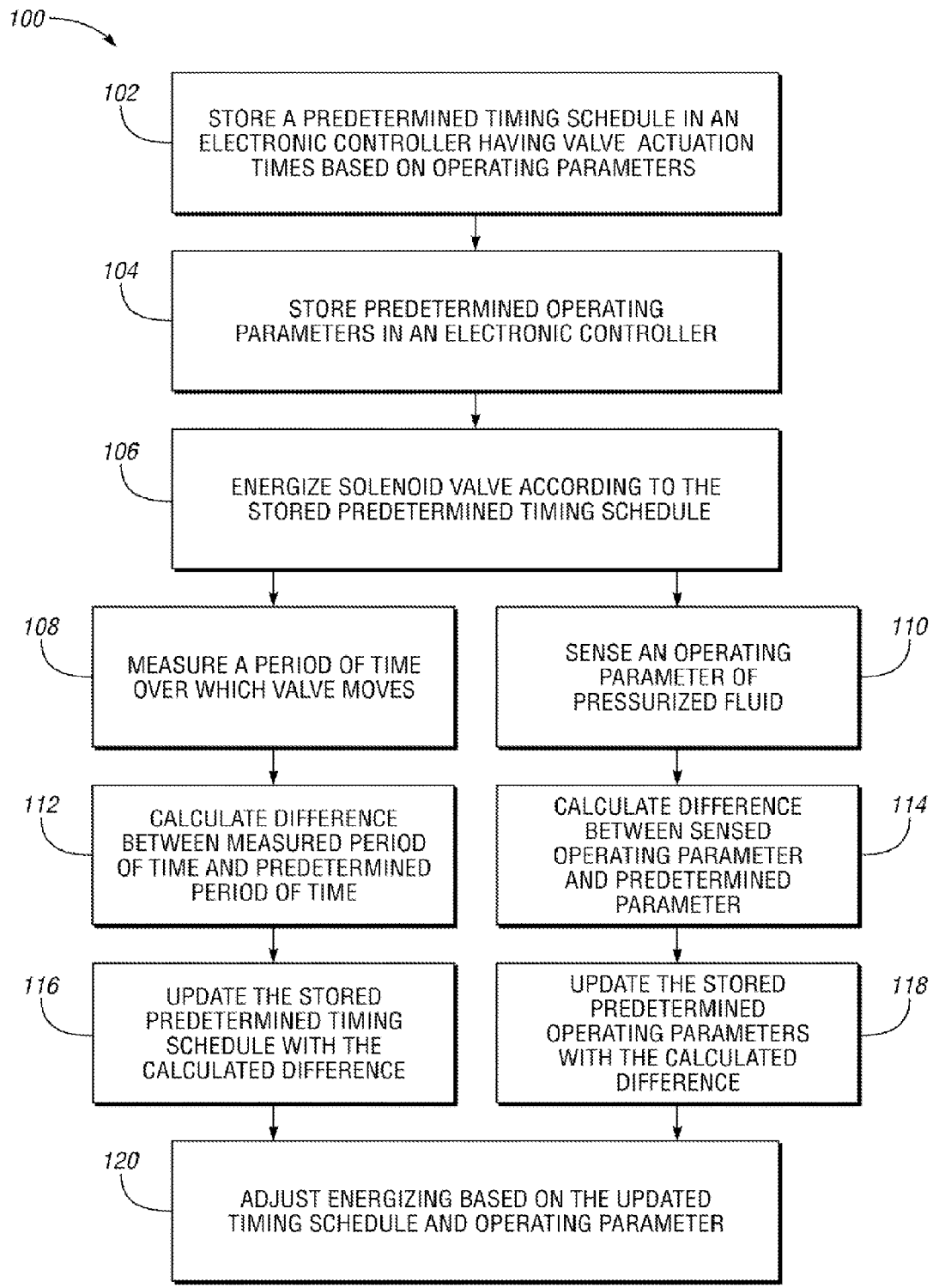
FIG. 7 is a flow diagram of a method of controlling a valve lift switching component.

Referring to FIG. 7, a method 100 of controlling a fluid pressure-actuated switching component, such as the rocker arm 14 or lash adjuster 16 of FIGS. 1, 3, 4, 5 and 6 is shown in a flow diagram. The method 100 is described with respect to the embodiment of FIG. 1, with references to the embodiments of FIGS. 3, 4, 5 and 6 as appropriate. Under step 102, a predetermined timing schedule is stored in an electronic controller 42. The predetermined timing schedule is stored in database 44. The timing schedule is calculated according to the algorithm and corresponding to input data for various engine operating parameters. The timing schedule ensures that energizing the solenoid valve 18, 18A or 18B will cause the rocker arm 14 and lash adjuster 16 to actuate at a time appropriate for the position of the engine camshafts, exhaust valves, etc.

In step 104, predetermined operating parameters are stored in the electronic controller 42, 42B. The predetermined operating parameters are based on prior operating conditions and previously sensed operating parameters sensed during previous switching events of the switching components, rocker arm 14 and lash adjuster 16.

In step 106, the solenoid valve 18, 18A or 18B is energized according to the stored predetermined timing schedule based on the predetermined operating parameters. Once the solenoid valve 18, 18A or 8B is energized, a period of time over which the valve moves is measured in step 108. As described with respect to FIG. 2, measuring the current draw by the solenoid valve 18, 18A or 18B between point A and point B is a measure of the travel time of the armature 36 and valve member 38. In step 112, the difference between the period of time measured in step 108 and a predetermined period of time (i.e., an expected travel time) stored in the database 44 is calculated. Then, in step 116, the stored predetermined timing schedule is updated to reflect the calculated difference. The updated timing schedule thus more accurately reflects the behavior of the valve 18 in response to actual operating conditions, such as fluid viscosity.

The sensors of the various hydraulic control system embodiments 12, 12A, 12B, 12C and 12D are also utilized to perfect the timing of energizing the solenoid valve 18, 18A, 18B, 18C or 18D. In step 110, an operating parameter of the pressurized fluid is sensed. The operating parameter may be pressure, as sensed by pressure sensor 60, 62, 62A, 66 or 66A, or temperature as sensed by temperature sensor 63, or other sensed operating parameters that may affect fluid viscosity or may be affected by fluid viscosity.

Under step 114, the difference between the operating parameter measured in step 108 and a predetermined operating parameter (i.e., an expected operating parameter) stored in the database 44 is calculated. Then, in step 118, the stored predetermined timing schedule is updated to reflect the calculated difference. The updated timing schedule thus more accurately reflects the behavior of the valve 18 in response to actual operating conditions, such as fluid viscosity.

Finally, in step 120, energizing of the solenoid valve 18, 18A, or 18B is adjusted based on the updated timing schedule and the updated operating parameters. The energizing is based on the newly updated stored predetermined timing schedule and the newly updated stored predetermined operating parameters. For solenoid valves 18, and 18A, the energizing is updated for the next scheduled switching event. For solenoid valve 18B, because processor 43A is integrated with the valve 18B in a module 64A, travel time of sensor signals to the processor 43A is relatively fast and the signals are not affected by system noise as may occur with signal travel over longer wire distances. These factors allow energizing of the solenoid valve 18B to be adjusted during the same shift event. That is, the amount of current can be adjusted as it is being supplied to the solenoid valve 18B to adjust the fluid flow to the rocker arm 14 and lash adjuster 16 to better meet desired actuation times of the rocker arm 14 and lash adjuster 16.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A method of controlling a fluid pressure-actuated switching component, comprising:
energizing a solenoid valve according to a predetermined timing schedule to move a valve member of the solenoid valve; wherein the valve member of the solenoid valve is moved directly by magnetic flux of the solenoid valve; wherein the solenoid valve is operatively connected to the switching component by a control passage in a valve manifold that delivers pressurized fluid from a supply passage when the valve member moves from a valve seat to thereby switch the switching component from a first mode to a second mode; wherein the valve member is positioned between the supply passage and the control passage and places the supply passage in fluid communication with the control passage when the valve member moves from the valve seat such that fluid flows past the valve seat from the supply passage to the control passage, and prevents fluid communication between the supply passage and the control passage when the valve member is seated on the valve seat;
measuring a period of time over which the valve member moves;
calculating a difference between the measured period of time and a predetermined period of time over which the valve member moves and on which the predetermined timing schedule is at least partially based; and
adjusting the energizing of the solenoid valve based on the difference between the measured period of time and the predetermined period of time.

2. The method of claim 1, wherein the adjusting the energizing of the solenoid valve is one of adjusting amount of current supplied to the solenoid valve and adjusting time prior to the desired switch that the current is supplied to the solenoid valve.

3. The method of claim 1, further comprising:
updating the predetermined timing schedule based on the measured period of time.

4. The method of claim 1, wherein the adjusting the energizing occurs after said energizing according to the predetermined timing schedule and after the switch resulting from said energizing according to the predetermined timing schedule.

5. The method of claim 1, wherein the adjusting the energizing occurs during said energizing according to the predetermined timing schedule and before the switch resulting from said energizing according to the predetermined timing schedule.

6. The method of claim 1, further comprising:
sensing an operating parameter of the pressurized fluid via at least one sensor in communication with the pressurized fluid;
calculating a difference between the sensed operating parameter and a predetermined value of the operating parameter on which the predetermined timing schedule is partially based; and
adjusting the energizing of the solenoid valve based on the difference between the sensed operating parameter and the predetermined operating parameter.

7. The method of claim 6, further comprising:
updating the predetermined timing schedule based on the sensed operating parameter.

8. The method of claim 6, wherein the at least one sensor includes a first sensor positioned to sense the operating parameter in the control passage downstream of the solenoid valve and upstream of the switching component.

9. The method of claim 8, wherein the at least one sensor further includes a second sensor positioned to sense the operating parameter in the control passage downstream of the solenoid valve and upstream of the switching component; and wherein the first sensor is closer to the solenoid valve than the second sensor and the second sensor is closer to the switching component than the solenoid valve.

10. The method of claim 6, wherein the at least one sensor is positioned in the supply passage upstream of the solenoid valve.

11. The method of claim 6, wherein the solenoid valve and the at least one sensor are integrated in a valve module installable in the valve manifold in fluid communication with the oil control passage.

12. The method of claim 6, wherein the solenoid valve and the at least one sensor are integrated in a valve module installable in the valve manifold in fluid communication with the control passage; wherein the valve module also includes a processor operatively connected to both the solenoid valve and the at least one sensor; and wherein the comparing and the adjusting of the energizing are via the processor within the valve module.

13. The method of claim 1, wherein the predetermined timing schedule is based on an operating cycle of an engine, and further comprising:
storing the predetermined timing schedule in a processor operatively connected to the solenoid valve.

14. A method of controlling actuation of a fluid pressure-actuated engine valve lift switching component, the method comprising:
energizing a solenoid valve according to a predetermined timing schedule stored in a controller to move a valve member of the solenoid valve; wherein the valve member of the solenoid valve is moved directly by magnetic flux of the solenoid valve; wherein the solenoid valve is operatively connected to the valve lift switching component by a control passage in a valve manifold for delivering pressurized fluid from a supply passage when the valve member moves from a valve seat to switch the valve lift switching component between a first lift mode and a second lift mode; wherein the valve member is positioned between the supply passage and the control passage and places the supply passage in fluid communication with the control passage when the valve member moves from the valve seat such that fluid flows past the first valve seat from the supply passage to the control passage, and prevents fluid communication between the supply passage and the control passage when the valve member is seated on the valve seat;
sensing an operating parameter of fluid in the control passage;
determining a difference between the sensed operating parameter and a predetermined value consistent with the predetermined timing schedule; wherein the sensed operating parameter is a difference in time at which two pressure sensors in the control passage reach a predetermined pressure;
updating the stored predetermined timing schedule based on the difference; and
energizing the solenoid valve based on the updated timing schedule.

15. A method of controlling a fluid pressure-actuated switching component, comprising:
energizing a solenoid valve according to a predetermined timing schedule to move a valve member of the solenoid valve; wherein the valve member of the solenoid valve is moved directly by magnetic flux of the solenoid valve; wherein the solenoid valve is operatively connected to the switching component by a control passage in a valve manifold that delivers pressurized fluid from a supply passage when the valve member moves away from a first valve seat and seats on a second valve seat to thereby switch the switching component from a first mode to a second mode; wherein the valve member is positioned between the supply passage and the control passage and places the supply passage in fluid communication with the control passage when the valve member moves from the first valve seat and is seated on the second valve seat such that fluid flows past the first valve seat from the supply passage to the control passage, and prevents fluid communication between the supply passage and the control passage when the valve member is seated on the first valve seat and moves away from the second valve seat such that fluid exhausts through an exhaust passage past the second valve seat;
measuring a period of time over which the valve member moves;
calculating a difference between the measured period of time and a predetermined period of time over which the valve member moves and on which the predetermined timing schedule is at least partially based;
adjusting the energizing of the solenoid valve based on the difference between the measured period of time and the predetermined period of time; and
updating the predetermined timing schedule based on the measured period of time.

16. The method of claim 15, wherein the adjusting the energizing of the solenoid valve is one of adjusting amount of current supplied to the solenoid valve to move the valve member from the valve seat and adjusting time prior to the desired switch that the current is supplied to the solenoid valve.

17. The method of claim 15, wherein the adjusting the energizing occurs after said energizing according to the predetermined timing schedule and after the switch resulting from said energizing according to the predetermined timing schedule.

18. The method of claim 15, wherein the adjusting the energizing occurs during said energizing according to the predetermined timing schedule and before the switch resulting from said energizing according to the predetermined timing schedule.

19. The method of claim 9, wherein both the first sensor and the second sensor are in the control passage.

20. The method of claim 14, wherein the two pressure sensors in the control passage include a first pressure sensor and a second pressure sensor; and wherein the first pressure sensor is positioned in the control passage and is closer than the second pressure sensor to the solenoid valve, and the second pressure sensor is positioned in the control passage and is closer than the first pressure sensor to the valve lift switching component.

* * * * *